(12) United States Patent
Park et al.

(10) Patent No.: US 8,583,012 B2
(45) Date of Patent: Nov. 12, 2013

(54) DRIVING DEVICE USABLE WITH IMAGE FORMING APPARATUS AND IMAGE FORMING APPARATUS HAVING THE SAME

(75) Inventors: Ji Youp Park, Yongin-si (KR); Jong Tae Kim, Kwachun-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 337 days.

(21) Appl. No.: 12/929,717

(22) Filed: Feb. 10, 2011

(65) Prior Publication Data
US 2012/0008985 A1    Jan. 12, 2012

(30) Foreign Application Priority Data
Jul. 12, 2010    (KR) .................. 10-2010-0066989

(51) Int. Cl.
*G03G 15/00*    (2006.01)

(52) U.S. Cl.
USPC ........................................... 399/167

(58) Field of Classification Search
USPC ................ 399/167; 74/414; 464/158
See application file for complete search history.

(56) References Cited

U.S. PATENT DOCUMENTS

| | | | |
|---|---|---|---|
| 1,346,115 A | 7/1920 | Carhart et al. | |
| 2,280,145 A | 4/1942 | Drabick | |
| 2,386,655 A | 10/1945 | Camzi | |
| 5,680,836 A | 10/1997 | Pierik | |
| 6,253,047 B1 * | 6/2001 | Hildebrand et al. | 399/167 |
| 7,702,258 B2 * | 4/2010 | Kim et al. | 399/167 |
| 7,983,600 B2 * | 7/2011 | Abe et al. | 399/167 |
| 2007/0295129 A1 | 12/2007 | Suzuki et al. | |

FOREIGN PATENT DOCUMENTS

| | | |
|---|---|---|
| EP | 0722210 A2 | 7/1996 |
| GB | 640641 | 9/1946 |
| GB | 2206054 A | 12/1988 |
| JP | 2004-258353 | 9/2004 |
| JP | 2005-292634 | 10/2005 |

OTHER PUBLICATIONS

European Search Report dated Nov. 18, 2011 issued in corresponding European Patent Application No. 11155091.9.

* cited by examiner

*Primary Examiner* — David Gray
*Assistant Examiner* — Gregory H Curran
(74) *Attorney, Agent, or Firm* — Staas & Halsey LLP

(57) ABSTRACT

A driving device includes a motor, and first and second gears having gear teeth engaged with each other. At least one of the first gear and the second gear includes a crowning portion formed at a tooth surface of each of the gear teeth such that the center of the tooth surface is more convex than both ends of the tooth surface in a tooth width direction. A height of the crowning portion is determined to effectively compensate for misalignment between the first gear and the second gear.

15 Claims, 6 Drawing Sheets

DRIVING DEVICE USABLE WITH IMAGE FORMING APPARATUS AND IMAGE FORMING APPARATUS HAVING THE SAME

CROSS-REFERENCE TO RELATED APPLICATIONS

This application claims the benefit of Korean Patent Application No. 2010-0066989, filed on Jul. 12, 2010 in the Korean Intellectual Property Office, the disclosure of which is incorporated herein by reference.

BACKGROUND

1. Field

Embodiments relate to a driving device usable with an image forming apparatus, which includes gears for power transmission.

2. Description of the Related Art

An image forming apparatus is designed to print an image on a recording medium such as paper, and so on. Examples of image forming apparatuses include printers, copiers, fax machines, and devices combining functions thereof.

Such an image forming apparatus includes driven elements, such as a variety of rollers, a photoconductor drum, a belt, and so on, which perform operations required to move paper or print an image on paper. These driven elements are driven by a driving device.

The driving device includes a motor, and power transmission members to transmit power from the motor to the driven elements. The power transmission members may include gears, couplers, and clutches for power control.

The gears transmit power while being engaged and rotated with each other. Although the gears are designed to realize perfect engagement thereof, the engaged gears may actually be misaligned. This misalignment may occur due to positional errors caused when the driven elements are mounted in the image forming apparatus, straightness/parallelism errors of gear supporting shafts, errors caused by deformation of the shafts or a frame supporting the shafts during power transmission, dimensional errors of the gears, and so on.

SUMMARY

Therefore, it is an aspect to provide a driving device usable with an image forming apparatus, which assures stable engagement of gears for power transmission, and an image forming apparatus having the same.

Additional aspects will be set forth in part in the description which follows and, in part, will be apparent from the description, or may be learned by practice of the invention.

In accordance with one aspect, a driving device usable with an image forming apparatus having a rotatable photoconductor, includes a motor, a first gear to be rotated upon receiving power from the motor and having gear teeth, and a second gear having gear teeth engaged with the gear teeth of the first gear and serving to transmit rotating power from the first gear to the photoconductor, wherein at least one of the first gear and the second gear includes a crowning portion formed at a tooth surface of each of the gear teeth such that the center of the tooth surface is more convex than both ends of the tooth surface in a tooth width direction, and wherein the crowning portion is formed to compensate for misalignment between the first gear and the second gear according to the following Equation: $\frac{1}{2}*W*(\pi/180°*\theta) \leq H$, wherein, "H" is a height of the crowning portion, "W" is a tooth width of the gear including the crowning portion, and "θ" is a misalignment angle between the first gear and the second gear and is measured in degrees.

The first gear and the second gear may have the same tooth width, each of the tooth surfaces of the first gear and the second gear may be provided with the crowning portion, and the height of the crowning portion may be the total of a height of the crowning portion formed at the first gear and a height of the crowning portion formed at the second gear.

The first gear and the second gear may have different tooth widths, and the crowning portion may be formed at one of the first gear and the second gear, which has a smaller tooth width than the other gear.

The crowning portion may be configured to satisfy the following Equation: $H \leq \frac{5}{4}*W*(\pi/180°*\theta)$.

The misalignment angle may have a maximum value of about 2.5°.

The tooth width of one of the first and second gears including the crowning portion may be determined to satisfy the following Equation: $W \geq 6M$, wherein, "M" is a module of the gear including the crowning portion.

The gear including the crowning portion may be an injection molded plastic gear.

In accordance with another aspect, a driving device usable with an image forming apparatus having a rotatable photoconductor, includes a motor, a driving gear having gear teeth and arranged to transmit rotating power from the motor to the photoconductor, and a power transmission gear to be rotated upon receiving power from the motor and having gear teeth engaged with the gear teeth of the driving gear, wherein the gear teeth of the driving gear and the gear teeth of the power transmission gear, which are engaged with each other, have different tooth widths, one of the driving gear and the power transmission gear includes a crowning portion formed at a tooth surface thereof such that the center of the tooth surface is more convex than both ends of the tooth surface in a tooth width direction, and wherein the crowning portion is formed to compensate for misalignment between the driving gear and the power transmission gear according to the following Equation: $\frac{1}{2}*Ws*(\pi/180°*\theta) \leq H \leq \frac{5}{4}*Ws*(\pi/180°*\theta)$, wherein, "H" is a height of the crowning portion, "Ws" is a smaller tooth width of the driving gear and the power transmission gear, and "θ" is a misalignment angle between the driving gear and the power transmission gear and is measured in degrees.

The height of the crowing portion may be about $\frac{5}{4}*Ws*(\pi/180*2.5)$ or less.

In accordance with a further aspect, an image forming apparatus includes a plurality of rotatable photoconductors, a motor to drive the plurality of photoconductors, at least one driving gear having gear teeth and arranged to transmit rotating power from the motor to a corresponding one of the plurality of photoconductors, and at least one power transmission gear to be rotated upon receiving power from the motor and having gear teeth engaged with the gear teeth of the driving gear, wherein at least one of the driving gear and the power transmission gear includes a crowning portion formed at a tooth surface of each of the gear teeth such that the center of the tooth surface is more convex than both ends of the tooth surface in a tooth width direction, and the crowning portion is formed to compensate for misalignment between the driving gear and the power transmission gear according to the following Equation: $\frac{1}{2}*W*(\pi/180°*\theta) \leq H \leq \frac{5}{4}*W*(\pi/180°*\theta)$, and $0°<\theta \leq 2.5°$, wherein "H" is a height of the crowning portion, "W" is a tooth width of the gear including the crowning portion, and "θ" is a misalignment angle between the driving gear and the power transmission gear and is measured in degrees.

The driving gear and the power transmission gear may have the same tooth width, each of the tooth surfaces of the driving gear and the power transmission gear may be provided with the crowning portion, and the height of the crowning portion may be the total of a height of the crowning portion formed at the driving gear and a height of the crowning portion formed at the power transmission gear.

The driving gear and the power transmission gear may have different tooth widths, and the crowning portion may be formed at one of the driving gear and the power transmission gear, which has a smaller tooth width than the other gear.

The tooth width of the gear including the crowning portion may be determined to satisfy the following Equation: $W \geq 6M$, wherein, "M" is a module of the gear including the crowning portion.

The plurality of photoconductors may include first, second, third and fourth photoconductors, the at least one driving gear may include a plurality of driving gears including first, second, third and fourth driving gears corresponding respectively to the first to fourth photoconductors, and the at least one power transmission gear may include a plurality of power transmission gears including a first power transmission gear engaged with the first and second driving gears and a second power transmission gear engaged with the third and fourth driving gears, and the crowning portion may be formed at each of tooth surfaces of the first and second driving gears engaged with the first power transmission gear and tooth surfaces of the third and fourth driving gears engaged with the second power transmission gear.

The first power transmission gear may have a greater tooth width than the first and second driving gears, and the second power transmission gear may have a greater tooth width than the third and fourth driving gears.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
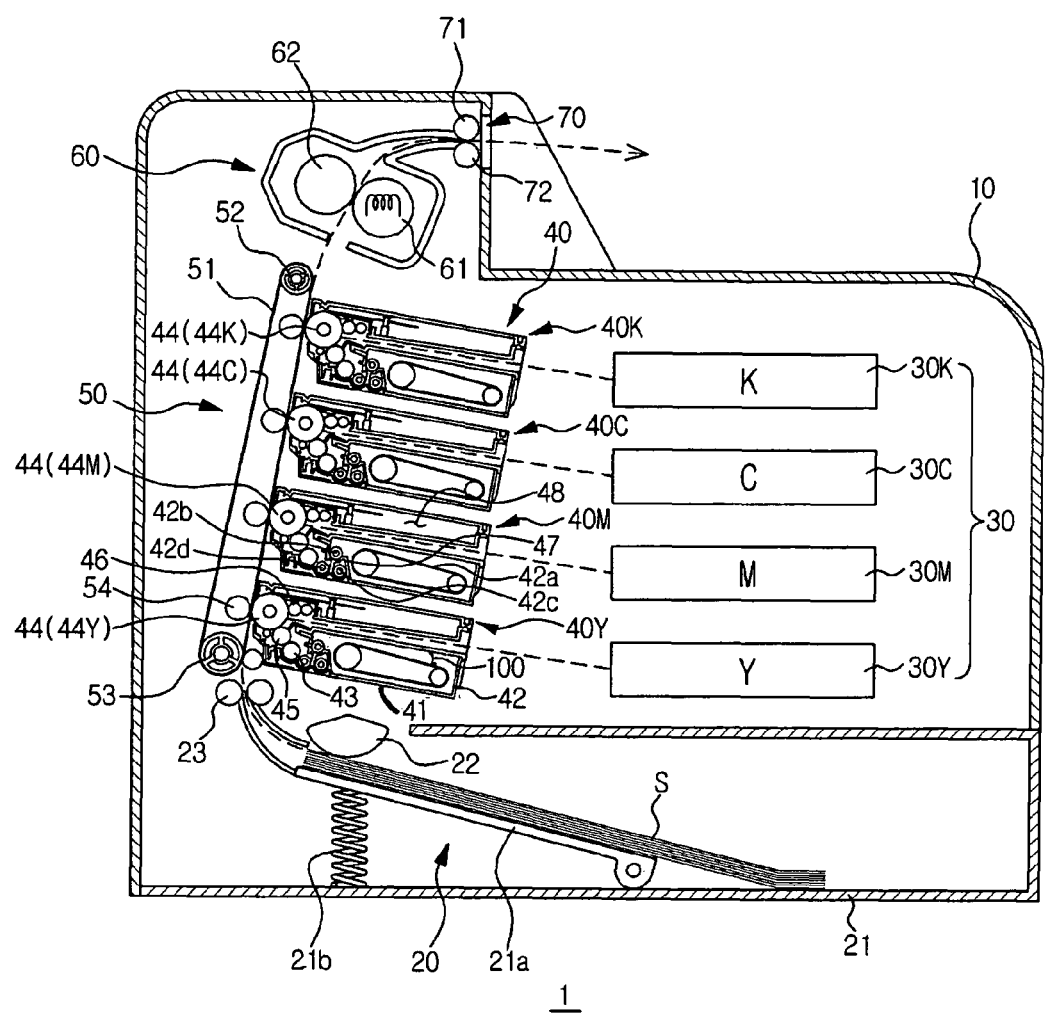
FIG. 1 is a view illustrating the configuration of an image forming apparatus according to an embodiment.

Reference will now be made in detail to the embodiments, examples of which are illustrated in the accompanying drawings, wherein like reference numerals refer to like elements throughout.

FIG. 1 is a view illustrating the configuration of an image forming apparatus according to an embodiment.

As illustrated in FIG. 1, the image forming apparatus 1 includes a main body 10, a recording medium supply unit 20, a light scanning unit 30, a developing unit 40, a transfer unit 50, a fusing unit 60, and a recording medium discharge unit 70.

The main body 10 defines the outer appearance of the image forming apparatus 1 and supports a variety of elements mounted therein. The main body 10 has an opening for installation and separation of the elements and a cover.

The recording medium supply unit 20 includes a cassette 21 having a tray 21a in which recording media S is stacked. The cassette 21 is separably mounted in the bottom of the body 10. A pickup roller 22 is provided to pick up the recording media S stored in the cassette 21 one by one. The recording media S stacked in the tray 21a is pushed toward the pickup roller 22 by a spring 21b, and is delivered to a delivery roller 23 via rotation of the pickup roller 22. The delivery roller 23 first aligns the picked up recording medium and thereafter, delivers it toward the transfer unit 50.

The light scanning unit 30 may include four light scanners 30Y, 30M, 30C and 30K, which scan light corresponding to Yellow, Magenta, Cyan and Black image information according to print signals. The four light scanners 30Y, 30M, 30C and 30K scan light to photoconductors 44Y, 44M, 44C and 44K of developing devices 40Y, 40M, 40C and 40K to form electrostatic latent images on surfaces of the photoconductors 44Y, 44M, 44C and 44K.

The light scanning unit 30 may include a light source to emit a laser beam, a light deflector to deflect the beam using a polygonal mirror, and lenses to focus the beam on the photoconductor.

The developing unit 40 may include the four developing devices 40Y, 40M, 40C and 40K in which different color developers, e.g., black, cyan, magenta and yellow developers are received.

Each of the developing devices 40Y, 40M, 40C and 40K includes a housing 41, photoconductor 44, developer receiving chamber 42, feed roller 43 and developing roller 45.

The developer receiving chamber 42 is defined in the housing 41 and stores developer to be fed to the photoconductor 44. The feed roller 43 is arranged in the housing 41 and serves to feed the developer stored in the developer receiving chamber 42 to the developing roller 45. The developing roller 45 attaches the developer to the surface of the photoconductor 44 on which the electrostatic latent image has been formed, to form a visible developer image.

The photoconductor 44 is an image carrier containing the electrostatic latent image formed by the light scanning unit 30 and the developer image formed by the developing unit 40. The photoconductor 44 is rotatably coupled to a tip end of the housing 41 and is rotated upon receiving power from a driving device (100, see FIG. 2). Although the present embodiment illustrates the photoconductor 44 as being integrally installed in the developing device, the photoconductor 44 may be separated from the developing device according to another embodiment.

Reference numeral 46 represents a charge roller, which charges the photoconductor 44 with a predetermined potential before the light scanning unit 30 scans light to the photoconductor 44.

A belt device 42a may be installed in the developer receiving chamber 42. The belt device 42a transmits a part of the developer stored in the developer receiving chamber 42 to a feed auger 42b, and in turn, the feed auger 42b feeds the developer to a first delivery auger 42c located therebelow. The first delivery auger 42c delivers the developer to a second delivery auger 42d that is arranged parallel to the first delivery auger 42c, and in turn, the second delivery auger 42d feeds the developer to the feed roller 43.

A partition 47 placed in the developer receiving chamber 42 bisects the interior of the developer receiving chamber 42. The partition 47 has a port (not shown) to communicate partitioned spaces with each other to allow the developer to be delivered in a predetermined path.

The housing 41 further defines a waste developer storage chamber 48 therein. Waste developer remaining on the surface of the photoconductor 44 after the image is transferred from the photoconductor 44 to the recording medium is delivered into the waste developer storage chamber 48.

The transfer unit 50 serves to transfer the visible image formed on the photoconductor 44 to the recording medium. The transfer unit 50 may include a recording medium delivery belt 51, driving roller 52, driven roller 53 and transfer rollers 54.

The recording medium delivery belt 51 is arranged to face the photoconductors 44Y, 44M, 44C and 44K and delivers the recording medium supplied from the recording medium supply unit 20. The recording medium may be attached to the recording medium delivery belt 51 via electrostatic force.

The driving roller 52 and the driven roller 53 are arranged inside the recording medium delivery belt 51 to support the recording medium delivery belt 51. The driving roller 52 comes into contact with an inner surface of the recording medium delivery belt 51 at one end of the recording medium delivery belt 51 to rotate the recording medium delivery belt 51 upon receiving power from a drive source. The driven roller 53 rotatably supports the other end of the recording medium delivery belt 51. One or more tension rollers (not shown) may be arranged inside the recording medium delivery belt 51 to press and tension the recording medium delivery belt 51.

The transfer rollers 54 are arranged to face the photoconductors 44Y, 44M, 44C and 44K respectively with the recording medium delivery belt 51 interposed therebetween and serve to transfer the visible images formed on the photoconductors 44Y, 44M, 44C and 44K to the recording medium.

The visible images formed on the photoconductors 44Y, 44M, 44C and 44K on a per color basis are sequentially transferred to overlap one another on the recording medium delivered by the recording medium delivery belt 51, thereby forming a color image on the recording medium.

The fusing unit 60 includes a heating roller 61 having a heat source and a press roller 62 arranged to face the heating roller 61. When the recording medium passes between the heating roller 61 and the press roller 62, the transferred images are fixed to the recording medium by heat transmitted from the heating roller 61 and pressure acting between the heating roller 61 and the press roller 62.

The recording medium discharge unit 70 includes a discharge roller 71 and a discharge backup roller 72, and serves to discharge the recording medium having passed through the fusing unit 60 to the outside of the main body 10.

Figure 2:
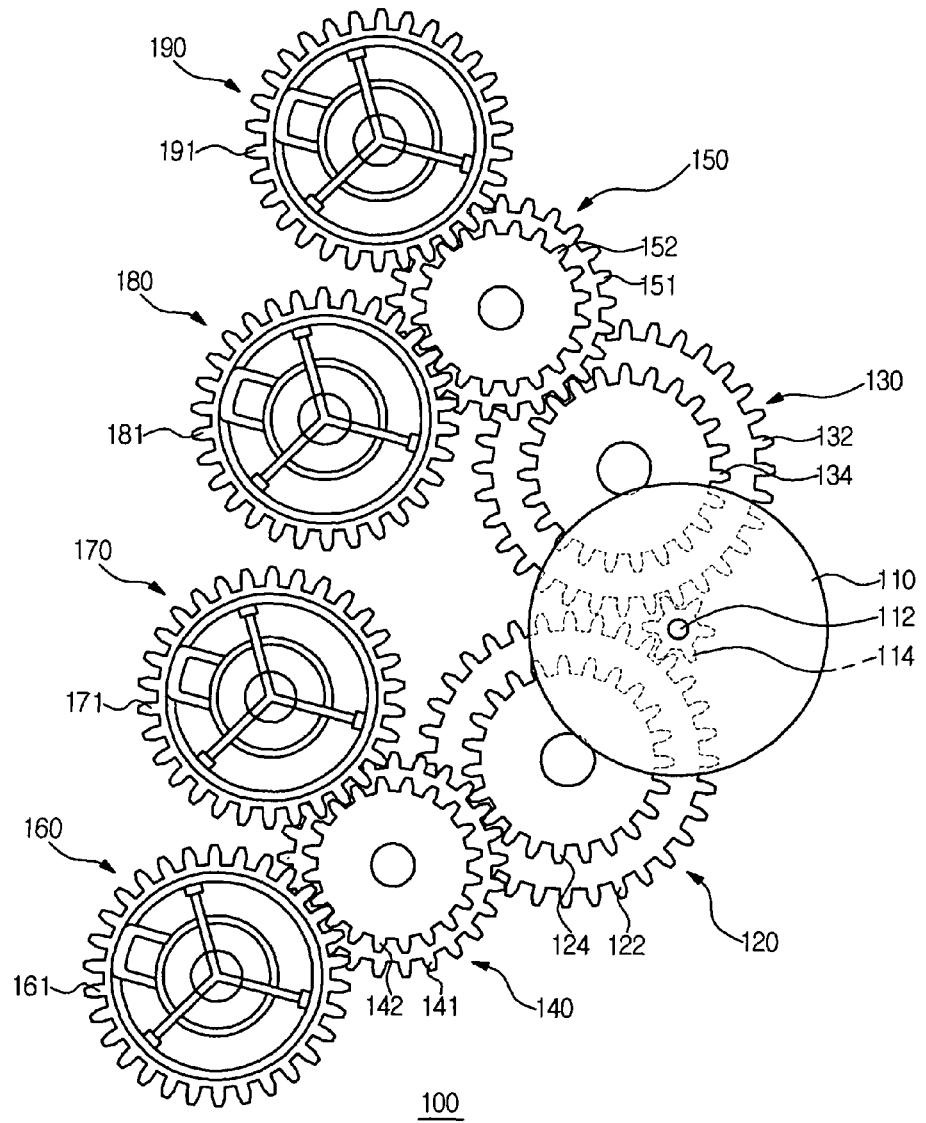
FIGS. 2 and 3 are views illustrating a driving device of the image forming apparatus according to the embodiment.
Figure 3:
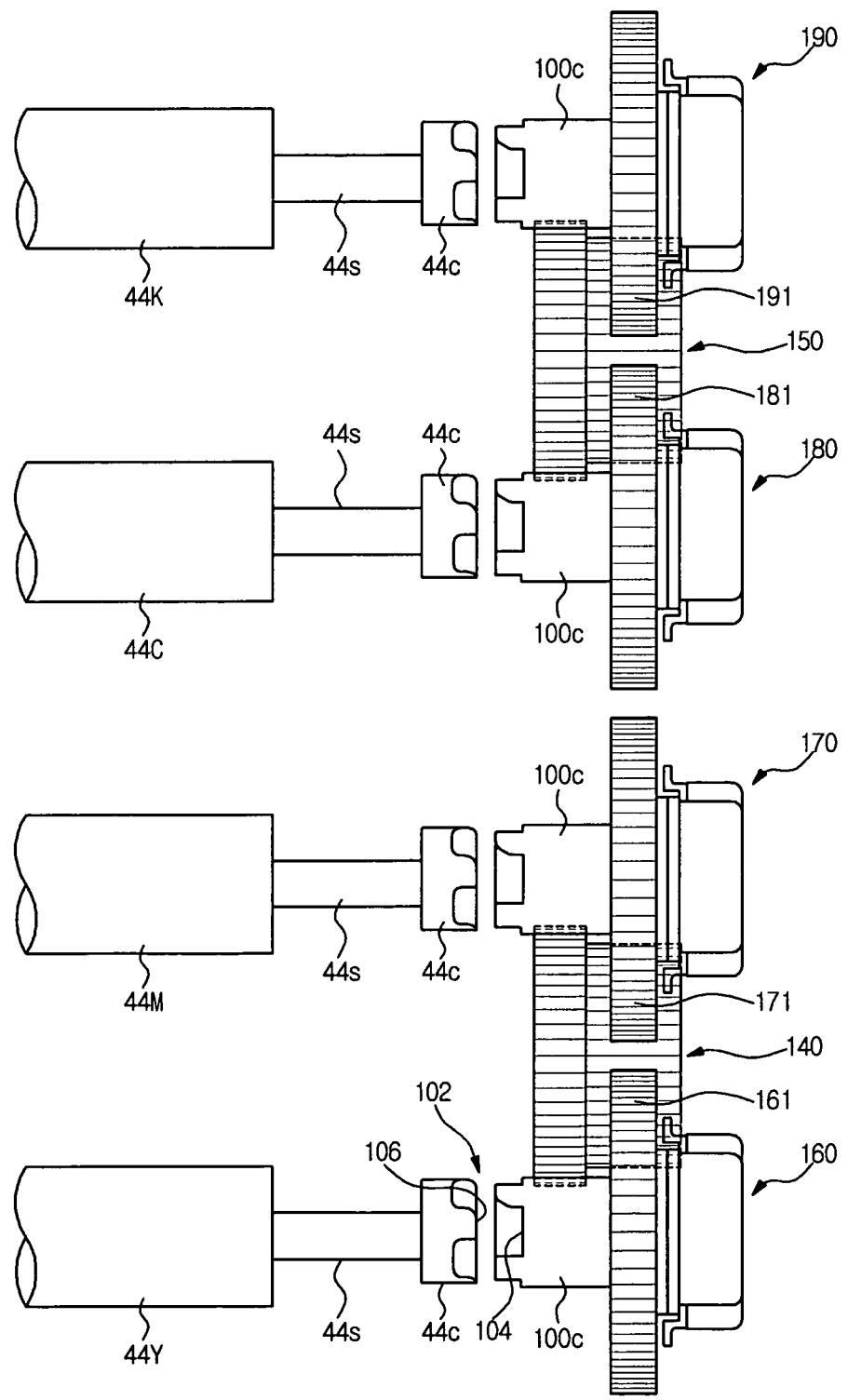

FIGS. 2 and 3 are views illustrating the driving device of the image forming apparatus according to the embodiment.

As illustrated in FIGS. 2 and 3, the driving device 100 includes a motor 110 to drive the photoconductors 44Y, 44M; 44C and 44K. A pinion 114 is coupled to a shaft 112 of the motor 110 and is engaged with two gear units 120 and 130.

The gear units 120 and 130 respectively have large gears 122 and 132 and small gears 124 and 134, which are arranged coaxially with each other. The large gears 122 and 132 of the gear units 120 and 130 are engaged with the pinion 114 of the motor 110. The small gear 124 of the gear unit 120 transmits power to a first power transmission gear unit 140, and the small gear 134 of the gear unit 130 transmits power to a second power transmission gear unit 150.

The first power transmission gear unit 140 is rotated while being engaged with the gear unit 120 and transmits rotating power to the two photoconductors 44Y and 44M of the photoconductors 44Y, 44M, 44C and 44K. The second power transmission gear unit 150 is rotated while being engaged with the gear unit 130 and transmits rotating power to the two photoconductors 44C and 44K of the photoconductors 44Y, 44M, 44C and 44K.

The first and second power transmission gear units 140 and 150 respectively have large gears 141 and 151 and small gears 142 and 152, which are arranged coaxially with each other. The large gears 141 and 151 of the first and second power transmission gear units 140 and 150 are engaged with the small gears 124 and 134 of the gear units 120 and 130 respectively.

The drive device 100 includes first, second, third and fourth driving gear units 160, 170, 180 and 190 arranged to correspond to the respective photoconductors 44Y, 44M, 44C and 44K to transmit power to the photoconductors. The driving gear units 160, 170, 180 and 190 may respectively include driving gears 161, 171, 181 and 191, and driving couplers 100c arranged coaxially with the driving gears.

The first driving gear 161 and the second driving gear 171 are engaged with the small gear 142 of the first power transmission gear unit 140, and the third driving gear 181 and the fourth driving gear 191 are engaged with the small gear 152 of the second power transmission gear unit 150.

The first power transmission gear unit 140, the second power transmission gear unit 150, and the first to fourth driving gears 161, 171, 181 and 191 may be spur gears or helical gears.

Each of the driving couplers 100c protrudes toward the corresponding photoconductor. Each of the photoconductors 44Y, 44M, 44C and 44K is provided with a driven coupler 44c at one end of a photoconductor shaft 44s. The driven coupler 44c is coupled with the corresponding driving coupler 100c to receive power from the driving coupler 100c when the developing device is mounted in the image forming apparatus.

Facing ends of the driving coupler 100c and the driven coupler 44c are provided with a coupling structure 102. The coupling structure 102 may include a recess and a protrusion corresponding to each other. As illustrated in FIG. 3, a coupling recess 104 having a predetermined cross section may be formed in the end of the driving coupler 100c and a coupling protrusion 106 having a shape corresponding to the coupling recess 104 may be formed at the end of the driven coupler 44c.

As illustrated in FIGS. 2 and 3, power from the motor 110 is transmitted to the photoconductors 44Y, 44M, 44CX and 44K via rotation of the engaged gears. Although power is transmitted according to a predetermined gear ratio if the gears have ideal engagement and rotation, the gears actually exhibit transmission errors due to misalignment thereof.

The transmission errors cause irregular variation of linear velocities of the photoconductors 44Y, 44M, 44C and 44K, and result in image defects, such as color registration errors, jitter and so on. Further, if the gears are misaligned, load is concentrated on a width direction end of a tooth surface, causing wear or deformation of teeth and generating excessive noise during rotation of the gears.

Figure 4:
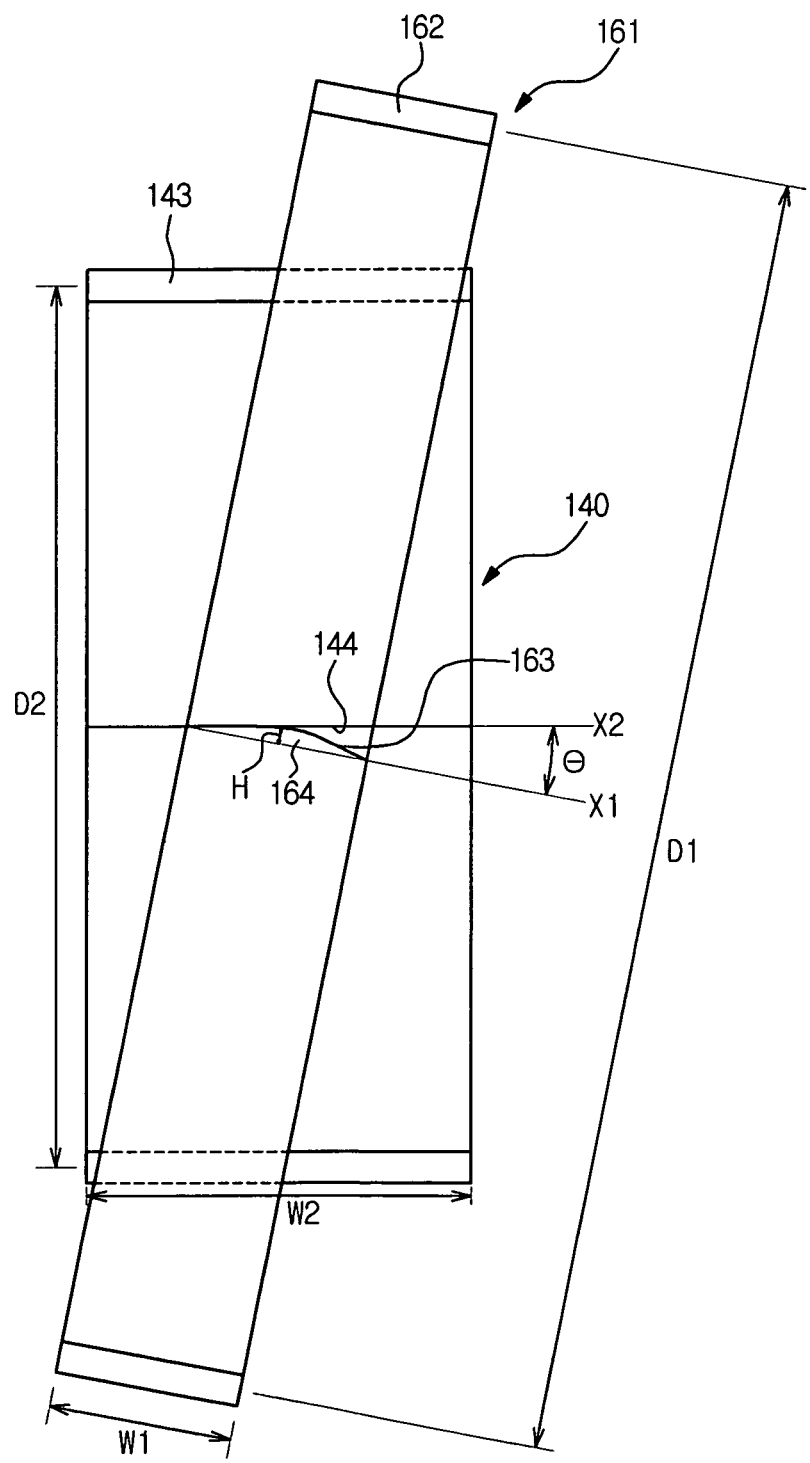
FIG. 4 is a view illustrating engagement of a power transmission gear and a driving gear included in the driving device according to the embodiment.
Figure 5:
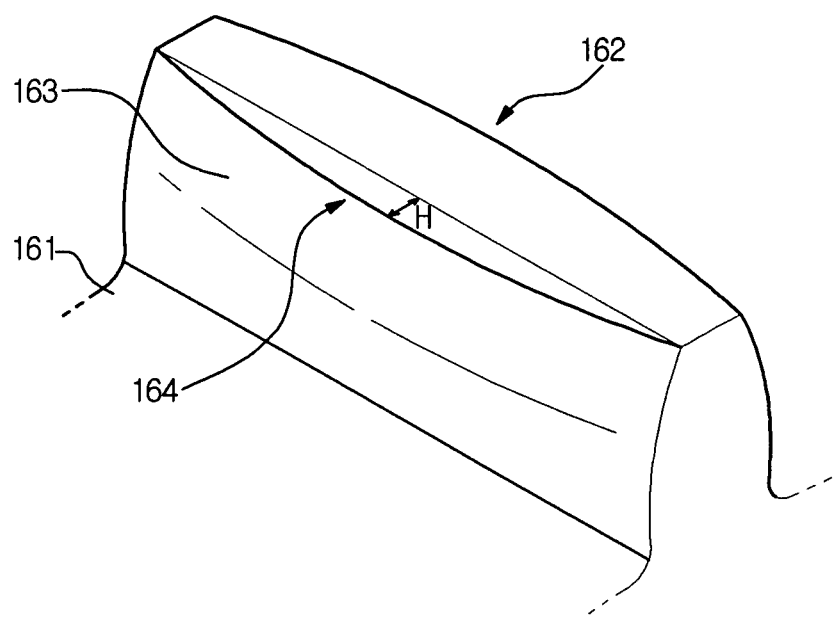
FIG. 5 is an enlarged perspective view illustrating a gear tooth of the driving gear included in the driving device according to the embodiment.

FIG. 4 is a view illustrating engagement of the power transmission gear and the driving gear included in the driving device according to the embodiment, and FIG. 5 is an enlarged perspective view illustrating a gear tooth of the driving gear included in the driving device according to the embodiment. Although the large gear 141 of the first power transmission gear unit 140 and the first driving gear 161 engaged with each other will be described hereinafter, the following description may be applied even to the other engaged gears. In FIG. 4, the large gear 141 of the first power transmission gear unit 140 is referred to as a first power transmission gear designated by reference numeral 140.

As illustrated in FIG. 4, the first power transmission gear 140 is formed at an outer circumference thereof with gear teeth 143, and the first driving gear 161 is formed at an outer circumference thereof with gear teeth 162 to be engaged with the gear teeth 143 of the first power transmission gear 140. In FIG. 4, reference numeral "163" represents a tooth surface of the first driving gear 161 that comes into contact with the gear teeth 143 of the first power transmission gear 140 during rotation of the first power transmission gear 140 and the first driving gear 161. Reference numeral "144" represents a tooth surface of the first power transmission gear 140 that comes into contact with the gear teeth 162 of the first driving gear 161.

The gear teeth 162 of the first driving gear 161 and the gear teeth 143 of the first power transmission gear 140, which are engaged with each other, have different widths. A tooth width W1 of the first driving gear 161 is smaller than a tooth width W2 of the first power transmission gear 140.

FIG. 4 illustrates an example in which a rotating axis X1 of the first driving gear 161 is tilted from a rotating axis X2 of the first power transmission gear 140, causing a misalignment angle θ between the first driving gear 161 and the first power transmission gear 140. Misalignment may occur for a variety of reasons, such as non-parallelism between supporting shafts of the first driving gear 161 and the first power transmission gear 140, deformation of the first driving gear 161 and the first power transmission gear 140 or a frame supporting these gears, and incorrect assembly of the first driving gear 161 and the first power transmission gear 140, and so on. In practice, it may be difficult to eliminate all of the causes of misalignment listed above so as to prevent misalignment.

Accordingly, the embodiment attempts to compensate for misalignment between the first driving gear 161 and the first power transmission gear 140, thereby preventing problems due to misalignment.

As illustrated in FIGS. 4 and 5, the tooth surface 163 of the first driving gear 161 may be formed with a crowning portion 164 such that the center of the tooth surface 163 is more convex than both ends of the tooth surface 163 in a tooth width direction.

A height H of the crowning portion 164 is determined to effectively compensate for misalignment between the two gears 161 and 140.

In FIG. 4, illustration of the angle θ is somewhat exaggerated, and the angle θ actually has a small value. Thus, the height H of the crowning portion 164 required to cause the first driving gear 161 and the first power transmission gear 140 to come into contact with each other at the center of the tooth surface 163 of the first driving gear 161 may be determined by the following Equation 1. Here, the angle θ is a misalignment angle between the first driving gear 161 and the first power transmission gear 140, and is measured in degrees.

$$\tfrac{1}{2}*W1*(\pi/180°*\theta)=H \qquad \text{Equation 1}$$

When power is transmitted as the tooth surfaces 163 and 144 of the two gears 161 and 140 come into contact with each other, force applied to the tooth surface 163 of the first driving gear 161 causes deformation. Thus, the value calculated by the above Equation 1 may be the minimum value of the height H of the crowning portion 164. That is, the height H of the crowning portion 164 is determined to satisfy the following Equation 2.

$$\tfrac{1}{2}*W1*(\pi/180°*\theta) \leq H \qquad \text{Equation 2}$$

Assuming that the crowning portion 164 has the height H calculated by the above Equation 2, the two gears 161 and 140 may stably come into contact with each other at the center of the tooth surface 163 over a relatively wide contact area even if the two gears 161 and 140 are misaligned. This may reduce power transmission error, thus improving image quality and preventing deformation of or damage to the gears caused when load is concentrated on width direction ends of the tooth surfaces 163 and 144 of the two gears.

In the meantime, if the height H of the crowning portion 164 is greater than 2.5 times the calculated value of the above Equation 1 even with due regard to backlash between the two engaged gears 161 and 140 and deformation of gear teeth caused upon engagement of the two gears 161 and 140, the two gears 161 and 140 may be jammed. Therefore, the height H of the crowning portion 164 may be determined to satisfy the following Equation 3.

$$H \leq \tfrac{5}{4}*W1*(\pi/180°*\theta) \qquad \text{Equation 3}$$

The first driving gear 161 may be plastic. The crowning portion 164 may be formed simultaneously with injection molding of the first driving gear 161, or may be formed by an additional process, for example, shaving after injection molding of the first driving gear 161.

The height H of the crowning portion 164 may be increased when it is desired to compensate for a relatively great misalignment angle. However, increasing the height H of the crowning portion 164 upon injection molding of the gears may be technically difficult and costs may be increased.

The misalignment angle between the two gears 161 and 140 caused by static errors, for example, straightness errors of shafts supporting the first driving gear 161 and the first power transmission gear 140, or assembly errors of the first driving gear 161 and the first power transmission gear 140 does not exceed about 2°. Also, the misalignment angle between the two gears 161 and 140 conventionally does not exceed 2.5° even with due regard to dynamic errors, for example, errors caused by deformation of the supporting shafts of the two gears 161 and 141 during rotation of the two gears 161 and 140.

Accordingly, the maximum value of the height H of the crowning portion 164 may be determined to have a value of $\tfrac{5}{4}*Ws*(\pi/180*2.5)$ according to the above Equation 3, thereby reducing the cost of the crowning portion 164 while effectively compensating for the misalignment of the two gears 161 and 140.

As calculated by the above Equations 2 and 3, the height H of the crowning portion 164 is proportional to the tooth width W1 of the first driving gear 161 having the crowning portion 164. If the tooth width W1 is small, the height H of the crowning portion 164 is also small and thus, the resulting crowning portion 164 may fail to effectively compensate for the misalignment between the two gears 161 and 140. In addition, the strength of the gear 161 may be deteriorated if the tooth width W1 of the first driving gear 161 is small.

Therefore, the tooth width W1 of the first driving gear 161 having the crowning portion 164 may be six times or more a module M of the first driving gear 161. The module M is a value defined by the following Equation 4.

$$M=D1/Z1 \qquad \text{Equation 4}$$

The module M is proportional to a dimension of the gear teeth 162 of the first driving gear 161. Here, "D1" is the diameter of a pitch circle of the first driving gear 161, and "Z1" is the number of teeth of the first driving gear 161.

The module M of the first driving gear 161 may be in a range of 0.3~1.0. For example, if the module M of the first driving gear 161 is 0.5, the tooth width W1 of the first driving gear 161 may be 3 mm or more.

As illustrated in FIGS. 4 and 5, if the two gears 161 and 140 have different tooth widths, it may be more reasonable to provide one of the gears 161 and 140 having a smaller tooth width, i.e. the first driving gear 161 with the crowning portion 164.

However, it may be possible to provide the other one of the two gears 161 and 140 having a greater tooth width with the crowning portion 164. In this case, although the height of the crowning portion 164 may be determined based on the tooth width of the first power transmission gear 140, it may be sufficient to determine the height of the crowning portion based on the tooth width of the first driving gear.

Figure 6:
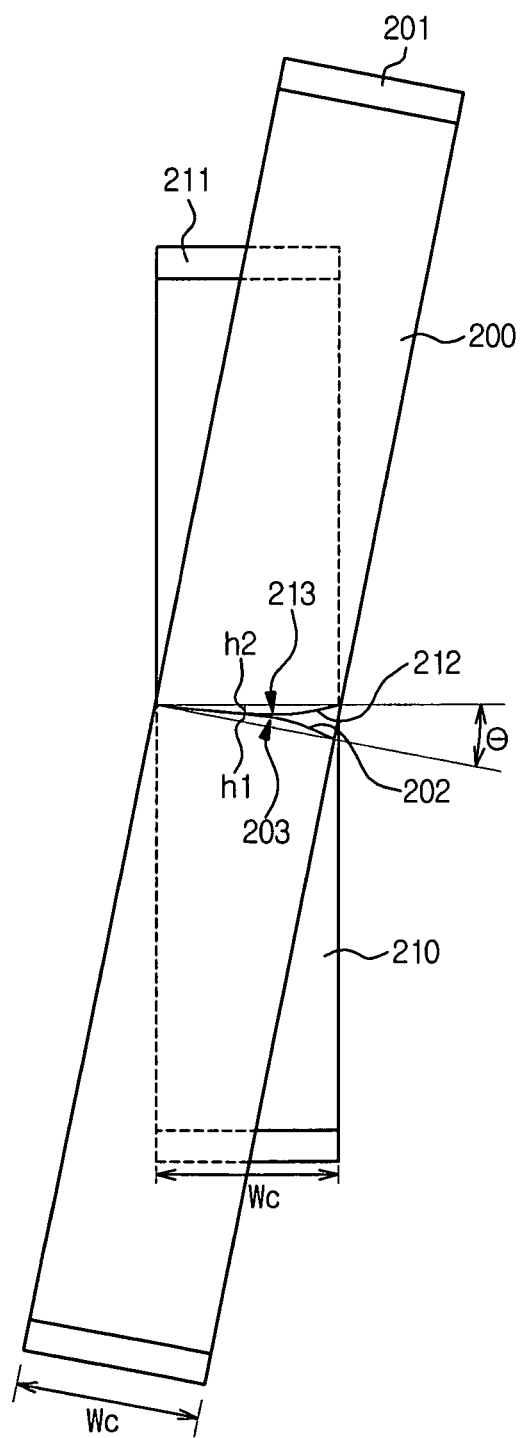
FIG. 6 is a view illustrating engagement of a power transmission gear and a driving gear included in the driving device according to another embodiment.

FIG. 6 is a view illustrating engagement of the power transmission gear and the driving gear included in the driving device according to another embodiment.

As illustrated in FIG. 6, a power transmission gear 210 and a driving gear 200 are provided at outer circumferences thereof with gear teeth 201 and 211 engaged with each other. The gear teeth 201 of the driving gear 200 and the gear teeth 211 of the power transmission gear 210, which are engaged with each other, have the same tooth width Wc.

Tooth surfaces 202 and 212 of the driving gear 200 and the power transmission gear 210 are provided respectively with crowning portions 203 and 213, to compensate for misalignment between the two gears 200 and 210. The height h1 and h2 of the crowning portions 203 and 213 may be determined to satisfy the following Equation 5. Here, "θ" is a misalignment angle between the driving gear 200 and the power transmission gear 210 and is measured in degrees.

$$\tfrac{1}{2}*Wc*(\pi/180°*\theta) \leq h1+h2 \leq \tfrac{5}{4}*Wc*(\pi/180°*\theta) \qquad \text{Equation 5}$$

According to the above Equation 5, the tooth surface 202 of the driving gear 200 and the tooth surface 212 of the power transmission gear 210 may centrally come into stable contact with each other, thereby preventing deformation of or damage to the gears and reducing generation of driving noise. In addition, it may be possible to prevent power from being irregularly transmitted to the photoconductors, resulting in improved image quality. Also, the crowning portions 203 and 213 formed at the driving gear 200 and the power transmission gear 210 may prevent the two gears 200 and 210 from being jammed.

The relationship between the misalignment angle range and the tooth width and module of the gears as described above with reference to FIGS. 4 and 5 may also be applied to the present embodiment.

As is apparent from the above description, a driving device usable with an image forming apparatus according to the embodiments may assure stable engagement and rotation of gears used to transmit power to photoconductors, resulting in improved image quality.

Further, it may be possible to prevent deformation of and damage to the gears, thereby reducing noise generation during operation of the gears.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A driving device usable with an image forming apparatus including a rotatable photoconductor, the driving device comprising:
a motor;
a first gear to be rotated upon receiving power from the motor and having gear teeth; and
a second gear having gear teeth engaged with the gear teeth of the first gear and serving to transmit rotating power from the first gear to the photoconductor,
wherein at least one of the first gear and the second gear includes a crowning portion formed at a tooth surface of each of the gear teeth such that the center of the tooth surface is more convex than both ends of the tooth surface in a tooth width direction, and
wherein the crowning portion is formed to compensate for misalignment between the first gear and the second gear according to $\tfrac{1}{2}*W*(\pi/180°*\theta) \leq H$,
where H is a height measurement of the convexity of the crowning portion, W is a tooth width of the gear including the crowning portion, and θ is a misalignment angle between the first gear and the second gear measured in degrees.

2. The driving device according to claim 1, wherein:
the first gear and the second gear have the same tooth width;
each of the tooth surfaces of the first gear and the second gear is provided with the crowning portion; and
the height of the crowning portion is the total of a height of the crowning portion formed at the first gear and a height of the crowning portion formed at the second gear.

3. The driving device according to claim 1, wherein:
the first gear and the second gear have different tooth widths; and
the crowning portion is formed at one of the first gear and the second gear, which has a smaller tooth width than the other gear.

4. The driving device according to claim 1, wherein the crowning portion is configured to satisfy $H \leq \tfrac{5}{4}*W*(\pi/180°*\theta)$.

5. The driving device according to claim 4, wherein the misalignment angle has a maximum value of about 2.5°.

6. The driving device according to claim 1, wherein the tooth width of one of the first and second gears including the crowning portion is determined to satisfy $W \geq 6M$,
where M is a module of the gear including the crowning portion.

7. The driving device according to claim 1, wherein the gear including the crowning portion is an injection molded plastic gear.

8. A driving device usable with an image forming apparatus including a rotatable photoconductor, the driving device comprising:
a motor;
a driving gear having gear teeth and arranged to transmit rotating power from the motor to the photoconductor; and
a power transmission gear to be rotated upon receiving power from the motor and having gear teeth engaged with the gear teeth of the driving gear,
wherein the gear teeth of the driving gear and the gear teeth of the power transmission gear, which are engaged with each other, have different tooth widths,
wherein one of the driving gear and the power transmission gear includes a crowning portion formed at a tooth surface thereof such that the center of the tooth surface is more convex than both ends of the tooth surface in a tooth width direction, and wherein the crowning portion is formed to compensate for misalignment between the driving gear and the power transmission gear according to $\tfrac{1}{2}*Ws*(\pi/180°*\theta) \leq H \leq \tfrac{5}{4}*Ws*(\pi/180°*\theta)$, where H is a height measurement of the convexity of the crowning portion, Ws is a smaller tooth width of the driving gear and the power transmission gear, and θ is a misalignment angle between the driving gear and the power transmission gear measured in degrees.

9. The driving device according to claim 8, wherein the height of the crowing portion is about $\tfrac{5}{4}*Ws*(\pi/180*2.5)$ or less.

10. An image forming apparatus, comprising:
a plurality of rotatable photoconductors;
a motor to drive the plurality of photoconductors;
at least one driving gear having gear teeth and arranged to transmit rotating power from the motor to a corresponding one of the plurality of photoconductors; and
at least one power transmission gear to be rotated upon receiving power from the motor and having gear teeth engaged with the gear teeth of the driving gear,
wherein at least one of the driving gear and the power transmission gear includes a crowning portion formed at a tooth surface of each of the gear teeth such that the center of the tooth surface is more convex than both ends of the tooth surface in a tooth width direction, and
wherein the crowning portion is formed to compensate for misalignment between the driving gear and the power transmission gear according to $\tfrac{1}{2}*W*(\pi/180°*\theta) \leq H \leq \tfrac{5}{4}*W*(\pi/180°*\theta)$, and $0° < \theta \leq 2.5°$, where H is a height measurement of the convexity of the crowning portion, W is a tooth width of the gear including the crowning portion, and θ is a misalignment angle between the driving gear and the power transmission gear measured in degrees.

11. The image forming apparatus according to claim 10, wherein:
the driving gear and the power transmission gear have the same tooth width;
each of the tooth surfaces of the driving gear and the power transmission gear is provided with the crowning portion; and
the height of the crowning portion is the total of a height of the crowning portion formed at the driving gear and a height of the crowning portion formed at the power transmission gear.

12. The image forming apparatus according to claim 10, wherein:
the driving gear and the power transmission gear have different tooth widths; and
the crowning portion is formed at one of the driving gear and the power transmission gear, which has a smaller tooth width than the other gear.

13. The image forming apparatus according to claim 10, wherein the tooth width of the gear including the crowning portion is determined to satisfy $W \geq 6M$, where M is a module of the gear including the crowning portion.

14. The image forming apparatus according to claim 10, wherein:
the plurality of photoconductors includes first, second, third and fourth photoconductors;
the at least one driving gear includes a plurality of driving gears including first, second, third and fourth driving gears corresponding respectively to the first to fourth photoconductors;
the at least one power transmission gear includes a plurality of power transmission gears including a first power transmission gear engaged with the first and second driving gears and a second power transmission gear engaged with the third and fourth driving gears; and
the crowning portion is formed at each of tooth surfaces of the first and second driving gears engaged with the first power transmission gear and tooth surfaces of the third and fourth driving gears engaged with the second power transmission gear.

15. The image forming apparatus according to claim 14, wherein the first power transmission gear has a greater tooth width than the first and second driving gears, and the second power transmission gear has a greater tooth width than the third and fourth driving gears.

* * * * *